(12) United States Patent
Starman et al.

(10) Patent No.: US 7,485,850 B2
(45) Date of Patent: Feb. 3, 2009

(54) GAIN/LAG ARTIFACT CORRECTION ALGORITHM AND SOFTWARE

(75) Inventors: Jared Starman, Stanford, CA (US);
Gary Virshup, Cupertino, CA (US);
Steve Bandy, Sunnyvale, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 116 days.

(21) Appl. No.: 11/495,401

(22) Filed: Jul. 27, 2006

(65) Prior Publication Data

US 2008/0023638 A1   Jan. 31, 2008

(51) Int. Cl.
*G01D 18/00* (2006.01)
(52) U.S. Cl. .................................. 250/252.1; 250/371
(58) Field of Classification Search .............. 250/252.1, 250/371
See application file for complete search history.

(56) References Cited

U.S. PATENT DOCUMENTS

| | | | |
|---|---|---|---|
| 2,990,473 A * | 6/1961 | Kallmann | 250/315.3 |
| 5,249,123 A | 9/1993 | Hsieh | |
| 6,246,746 B1 * | 6/2001 | Conrads et al. | 378/98.7 |
| 6,600,159 B2 | 7/2003 | Overdick et al. | |
| 6,701,000 B1 | 3/2004 | Hsieh | |
| 2002/0064254 A1 * | 5/2002 | Aoki et al. | 378/98.7 |
| 2003/0057376 A1 * | 3/2003 | Kim | 250/370.09 |

OTHER PUBLICATIONS

Michael Overdick et al, Temporal Artefacts in Flat Dynamic X-ray Detectors, Phillips Research Laboratories, Aachen, Germany, Proc. SPIE vol. 4320 (2001) pp. 47-58.

* cited by examiner

*Primary Examiner*—David P Porta
*Assistant Examiner*—David S Baker
(74) *Attorney, Agent, or Firm*—Blakely, Sokoloff, Taylor & Zafman LLP

(57) ABSTRACT

A method is described. A total number of traps to be filled in a detector of an imaging system is estimated based on a measured signal sensed by the detector. The measured signal is adjusted based on the estimated total number of traps and a current trap state of the detector. The trap state of the detector is subsequently updated.

23 Claims, 13 Drawing Sheets

| Trap Branch i | R | C |
|---|---|---|
| 1 | 93 | 0.03 |
| 2 | 73 | 0.26 |
| 3 | 167 | 0.6 |
| 4 | 391 | 1.6 |

FIG. 5 in a diagram showing one embodiment of a detector.
GAIN/LAG ARTIFACT CORRECTION ALGORITHM AND SOFTWARE

TECHNICAL FIELD

This invention relates to the field of an imaging system and, in particular, to solid state detectors.

BACKGROUND

A Computed Tomography system may collect data by using a large flat panel digital x-ray device, imager, or detector, having a plurality of pixels arranged in rows and columns. Large flat panel imagers function by accumulating charge on capacitors generated by the pixels of photodiodes (amorphous silicon or organic semiconductor) with scintillators or by pixels of photoconductors. Typically, many pixels are arranged over a surface of the imager where TFTs (or single and/or double diodes) at each pixel connect the charged capacitor to a read-out amplifier at the appropriate time. A pixel is composed of the scintillator/photodiode/capacitor/TFT or switching-diode combination or by the photoconductor/capacitor/TFT or switching-diode combination. Often the photodiode intrinsically has enough capacitance that no separate charge storage capacitor is required. Radiation (e.g., alpha, beta, gamma, X-ray, neutrons, protons, heavy ions, etc.) strikes the scintillator and causes the scintillator to generate visible light. The visible light strikes a photodiode and generates an electric current. Alternatively, an imager may be configured such that the radiation strikes a biased photoconductor to generate the electric current. The current charges a capacitor and leaves a charge on the capacitor. The integrated charge on the capacitor is proportional to the integrated light intensity striking the respective photoconductor for a given integration time. At an appropriate time, a switch (e.g., a TFT or switching diode(s)) activates and reads out the charge from the capacitor.

However, such flat panel imagers suffer from detector lag. The detector lag causes a significant portion of the signals from previous samples to incorrectly bias subsequent samples. A significant cause of the lag is related to the electron de-trapping resulting from the high density electronic defects in the energy band gap. De-trapping times range from a few milliseconds to as long as 100 seconds, days, weeks, or even months. As a result of the non-uniformity of the lag, artifacts, such as rings and bands, occur in the reconstructed images.

Prior correction methods have been implemented to estimate offset correction. One prior background correction method discussed in U.S. Pat. No. 5,249,123 applies a filter function to the output signal. Another prior background correct method discussed in U.S. Pat. No. 6,701,000 energizes each detector pixel to reduce residual signal in-between data acquisitions when the x-ray emission is stopped. In Overdick, a hardware solution is described to eliminate the gain and lag effects from flat panel detectors. LEDs that are built into the panel saturate the traps in the detector, which minimize the temporal artifacts.

Some of the proposed methods have assumed that the lag was the result of a linear time invariant process. However, this may be false because the time constants associated with traps filling with charge and releasing charge can be different. Thus, a correction based on assuming linearity and time invariance will not fully correct the data. The solution presented in Overdick requires a hardware modification to existing flat-panel x-ray detectors that do not already have the LED electronics built-in.

BRIEF DESCRIPTION OF THE DRAWINGS

The present invention is illustrated by way of example, and not by way of limitation, in the figures of the accompanying drawings.

FIG. 5 is a table illustrating an example of values of Rs and Cs for the electrical circuit of FIG. 4.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of the present invention include various operations, which will be described below. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Figure 1A:
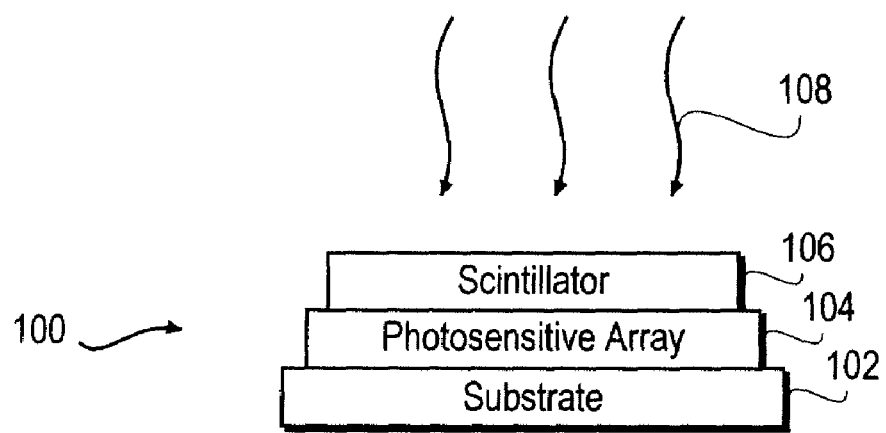
FIG. 1A is a schematic diagram illustrating one embodiment of a detector.

FIG. 1A is a schematic diagram illustrating one embodiment of a detector 100. The detector 100 may be a solid-state detector or radiation imager in a large flat panel configuration having a photosensor array 104 disposed on a substrate 102 and a scintillator 106 disposed on the photosensor array 104. Scintillator 106 is disposed so as to receive and absorb incident radiation, e.g., x-ray beam 108. Scintillator 106 is optically coupled to photosensor array 104 so that optical photons generated in scintillator 106 pass into photosensor array 104. Photosensor array 104 may include a plurality of photosensors (not shown), such as photodiodes, and an addressable thin film transistor (TFT) array (not shown) electrically coupled to each photosensor. In one embodiment, each photosensor includes an amorphous silicon (a-Si) photodiode (not shown).

Figure 1B:
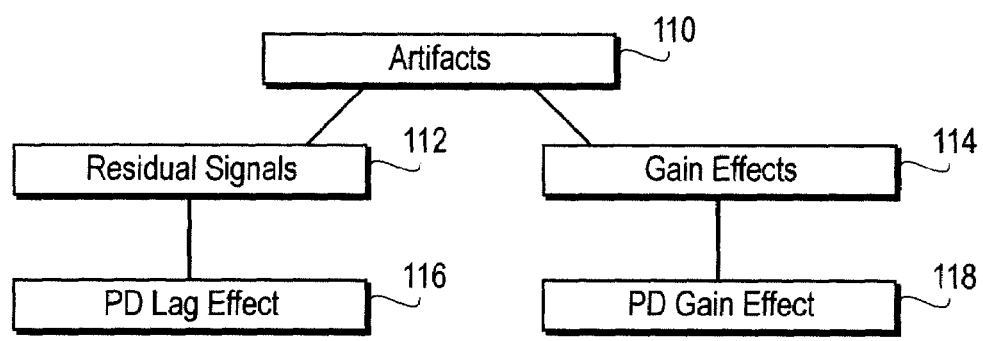
FIG. 1B is a schematic diagram of a classification of the artifacts and their sources.

FIG. 1B is a schematic diagram of a classification of the artifacts and their sources. Artifacts 110 may include residual signals 112 of a detector and gain effects 114 from the traps already filled in the detector. The residual signals 112 may be caused by the photodiode (PD) lag effect 116. The gain effects 114 may be caused by the PD gain effect 118.

Figure 2:
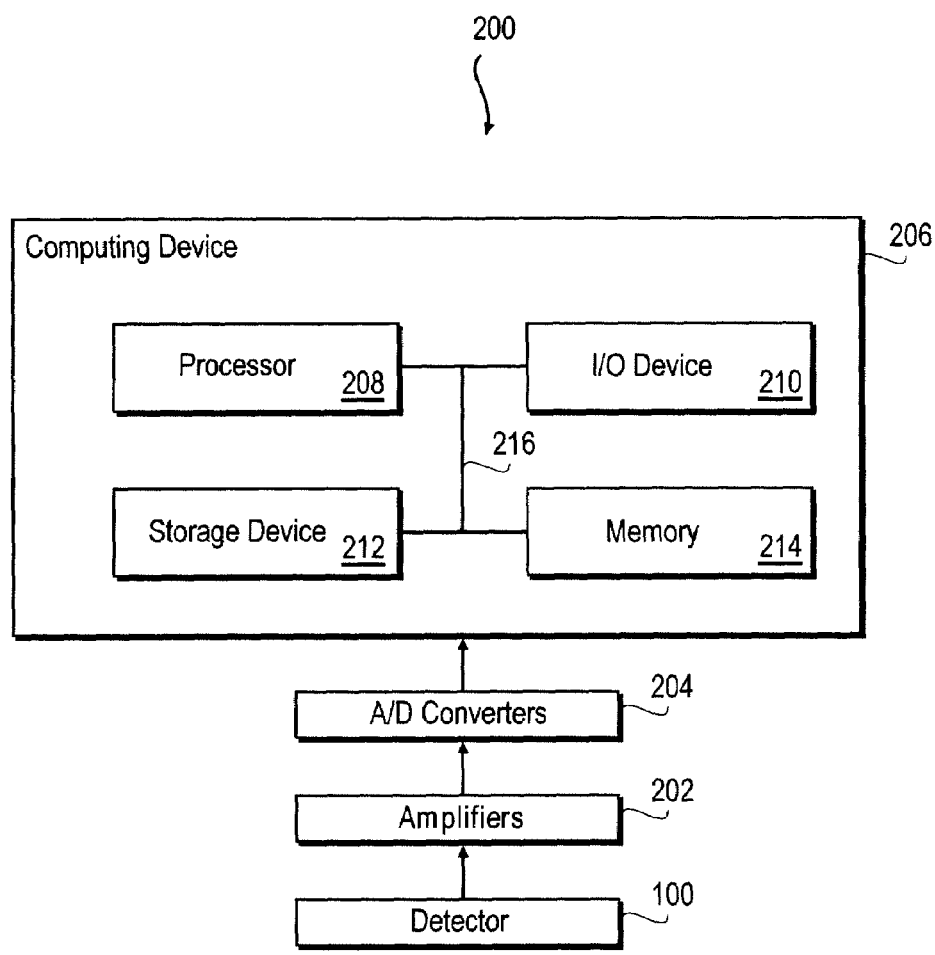
FIG. 2 is a schematic diagram illustrating one embodiment of an imaging system.

FIG. 2 is a schematic diagram illustrating one embodiment of an imaging system. Imaging system 200 includes a computing device 206 coupled to detector 100. The detector 100, may be also, for example, an amorphous silicon organic semiconductor TFT or diode-switched array imager. As previously discussed in FIG. 1, detector 100 functions by accumulating charge on capacitors generated by pixels of photodiodes (amorphous silicon or organic semiconductor) with scintillators or by pixels of biased photoconductors. Typically, many pixels are arranged over a surface of the detector 100 where, for example, TFTs (or single and/or double diodes) at each pixel connect a charged capacitor to charge sensitive amplifier 202 at the appropriate time. Charge sensitive amplifiers 202 drive analog to digital (A/D) converter 204 that, in turn, converts the analog signals received from amplifiers 202 into digital signals for processing by computing device 206. A/D converter 204 may be coupled to computing device 206 using, for example, I/O device 210 or interconnect 216. A/D converter 204 and charge sensitive amplifiers 202 may reside within computing device 206 or detector 100 or external to either device.

Computing device 206 implements the methods for correction of imaging sensors due to the traps from the detector 100. The methods that may be performed by computing device 206 constitute computer programs made up of computer-executable instructions illustrated as steps in the following examples of the methods illustrated in the following figures. In one embodiment, computing device 206 includes a processor 208, storage device 212, input/output (IO) device 210, and memory 214 that are all coupled together with interconnect 216, such as a bus or other data path. In another embodiment, the computing device may be implemented using Programmable Logic Devices (PLD) or Field Programmable Gate Arrays (FPGA), in which the mathematical operations are performed by physical devices like adders, multipliers, etc. In another embodiment, the computing device may be implemented using specialized integrated circuits for data processing like adders, multipliers, bus switches, registers, RAM, ROM logic gates, etc.

Processor 208 represents a central processing unit of any type of architecture (e.g., Intel architecture or Sun Microsystems architecture), or hybrid architecture. In addition, processor 208 could be implemented in one or more semiconductor chips. In an alternative embodiment, for example, the processor 208 may be a network processor having multiple processors including a core unit and multiple microengines. Additionally, processor 208 may include any combination of general-purpose processing device(s) and special-purpose processing device(s).

Storage device 212 represents one or more mechanisms for storing data and/or instructions such as the method steps of the invention. Storage device 212 represents read-only memory (ROM), random access memory (RAM), magnetic disk storage media, optical storage media, flash memory devices, and/or other machine-readable media. Interconnect 216 represents one or more buses (e.g., accelerated graphics port bus, peripheral component interconnect bus, industry standard architecture bus, X-Bus, video electronics standards association related buses, etc.) and bridges (also termed bus controllers). I/O device 216 represents any of a set of conventional computer input and/or output devices including, for example, a keyboard, mouse, trackball or other pointing device, serial or parallel input device, display monitor, plasma screen, or similar conventional computer I/O devices.

Memory 214 represents a high-speed memory device for retaining data and processor instructions for processor 208 according to the method steps of the invention. Memory 214 can be implemented using any of the memory devices described above for storage device 212. In addition, memory 214 can be used as a data cache for processor 208. While this embodiment is described in relation to a single processor computer system, in another embodiment, the invention may be implemented in a multi-processor computer system.

Figure 3A:
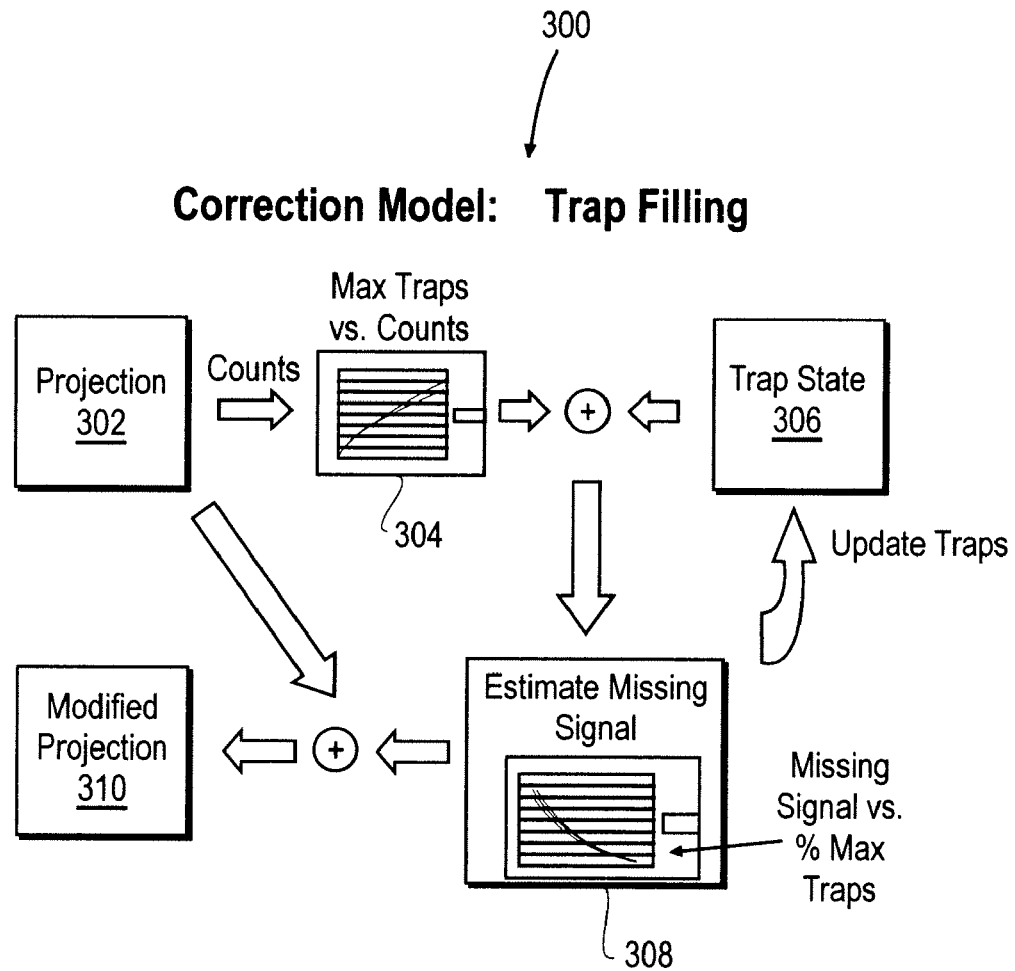
FIG. 3A is a schematic diagram illustrating one embodiment of a correction model for trap filling in accordance with one embodiment.

FIG. 3A is a schematic diagram illustrating one embodiment of a correction model 300 for trap filling in accordance with one embodiment. A projection using an imaging system is performed at 302. The imaging system may comprise a source of radiation, a detector for sensing radiation from the source and for generating data representative of the radiation. A processor may be coupled to the detector and may be configured to modify the data based on an estimated total number of traps and a current trap state of the detector. The source of radiation may include an x-ray source emitting an x-ray beam onto the detector. An object to be examined may be placed adjacent to the detector between the source of radiation and the detector. The detector may have least one solid state x-ray detector (e.g. a thin-film transistor (TFT), a capacitor, a photodiode, or a photoconductor). The detector dose rate, or counts in a single frame of projection data may be determined by the projection 302. The number of counts is applied to an empirical model 304 to determine the total number of traps to be filled, or the maximum number of traps given a specific count. An example of such empirical model 304 is further described below and illustrated in FIG. 6. The empirical model is further described below and illustrated in FIG. 8.

The current trap state 306 of the detector includes the current number of traps filled based on the past usage of the detector. By knowing the total number of traps to be filled from the empirical model 304, and the current number of traps filled in the detector, the number of missing signal 308 can be estimated. The projection data 302 can thus be modified accordingly by adding the estimated missing signal 308 to generate a modified projection data 310. Meanwhile, trap state 306 may be updated to reflect the latest state of the traps in the detector.

Figure 3B:
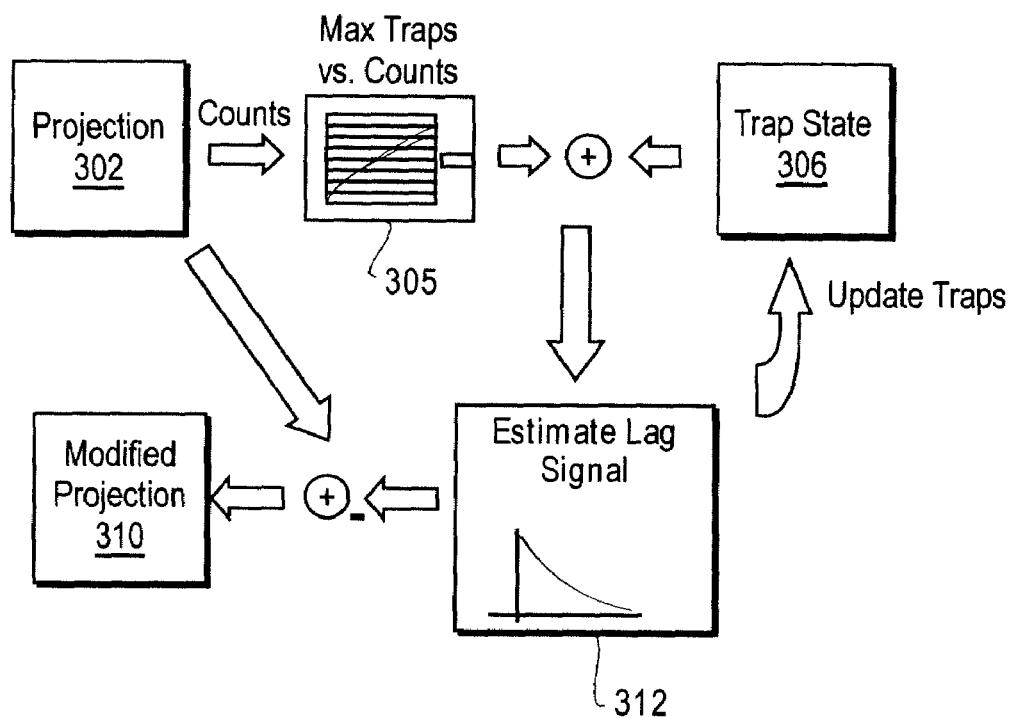
FIG. 3B is a schematic diagram illustrating one embodiment of a correction model for trap emptying in accordance with one embodiment.

FIG. 3B is a schematic diagram illustrating one embodiment of a correction model 301 for trap emptying in accordance with one embodiment. A projection using the imaging system is performed at 302. The detector dose rate, or counts in a single frame of projection data may be determined by the projection 302. The number of counts is applied to an empirical model 305 to determine the total number of traps to be filled, or the maximum number of traps given a specific count. An example of such empirical model 305 is further described below and illustrated in FIG. 6. The empirical model is further described below and illustrated in FIG. 8.

The current trap state 306 of the detector includes the current number of traps filled based on the past usage of the detector. By knowing the total number of traps to be filled from the empirical model 305, and the current number of traps filled in the detector, the lag signal 312 can be estimated. The projection data 302 can thus be modified accordingly by subtracting the estimated lag signal 312 to generate a modified projection data 310. Meanwhile, trap state 306 may be updated to reflect the latest state of the traps in the detector.

FIG. 4 is a schematic diagram of an electrical circuit used in the method of FIGS. 3A and 3B in accordance with one embodiment. A linear component model for trap filling and emptying is illustrated. Each R and C combination represents a different trap energy level. The model illustrated in FIG. 4 has four different energy levels 406, 408, 410, and 412. Those of ordinary skills in the art will recognize that any number N could be used to model the trap distribution. The voltage V 402 is proportional to the photo-diode current, I. In accordance with another embodiment, the voltage source 402 may be replaced with a current source.

The trap filling and emptying may be responsible for gain change and lag in the detector. Thus, each RC branch in the model represents one discretized energy level. Traps at lower energy levels collect and release charge over very short time scales (microseconds or less). Traps at higher energy levels on the other hand can collect and release charge over much larger times scales (minutes, hours, or days). The product RC represents the time constant of filling and emptying of traps for that specific energy level. Different time constants may be used for emptying and filling by changing R accordingly. C represents the total number of traps that exist at a specific energy level.

As the detector is irradiated, the traps begin to capture charge represented as filling the parasitic capacitors C1 to C4 with time constants RC. Thus, because of the presence of C1-C4, the total charge seen by a readout electronics (not shown) is reduced (i.e. a lower signal is measured than expected) compared to the previous designs which do not contain C1-C4. As C1-C4 collect more and more charge, less charge is diverted to C1-C4. Thus the overall gain of the detector appears to change during the charging of C1-C4. When the detector is not being exposed to radiation (e.g. x-ray). The current source is turned off, and C1-C4 discharge any charge that has been accumulated. This models the lag behavior of the detector.

Figure 4A:
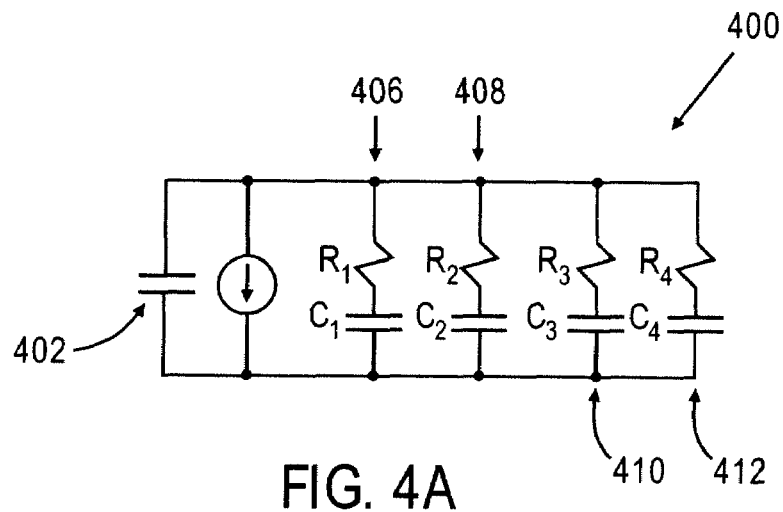
FIG. 4A is a schematic diagram of an electrical circuit used in the method of FIGS. 3A and 3B in accordance with one embodiment.
Figure 4B:
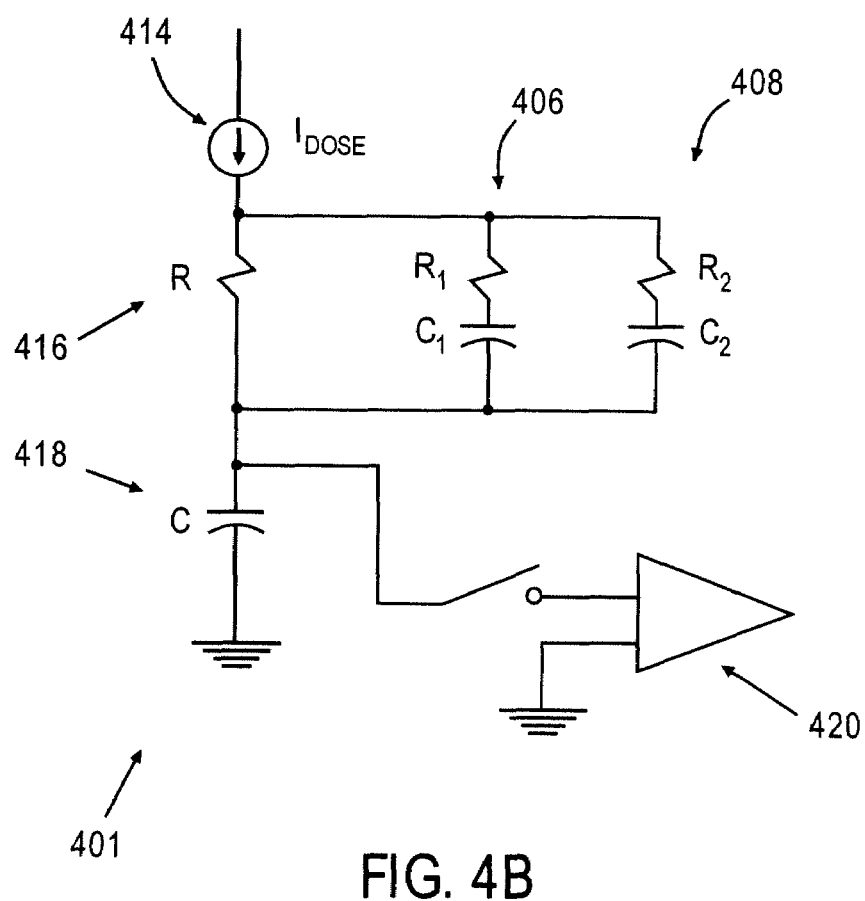
FIG. 4B is a schematic diagram of the electrical circuit of FIG. 4A in the context of a detector electronics in accordance with one embodiment.

FIG. 4B is a schematic diagram of the electrical circuit of FIG. 4A in the context of a detector electronics in accordance with one embodiment. The electrical circuit of FIG. 4A may be inserted into the pixel electronics of a detector. FIG. 4B illustrates an example of a pixel electronics circuit 401 with only two RC branches 406, 408. The pixel electronics circuit 401 has a current source I dose 414, a resistor R 416, a capacitor C 418, and a logic 420.

FIG. 5 is a table illustrating an example of values of Rs and Cs. The values of the time constants (Rs and Cs) can be determined in many ways. One method is further discussed below and illustrated in FIG. 8. Once the Rs and Cs are known, they can be used to estimate the true photo-diode current, and not just the charge seen by the read out electronics. In theory, the resulting corrected data may have a constant gain, and not lag signal may be present. The final result is corrected projection data which can then be used as a projection image directly or for CT reconstruction.

Figure 6:
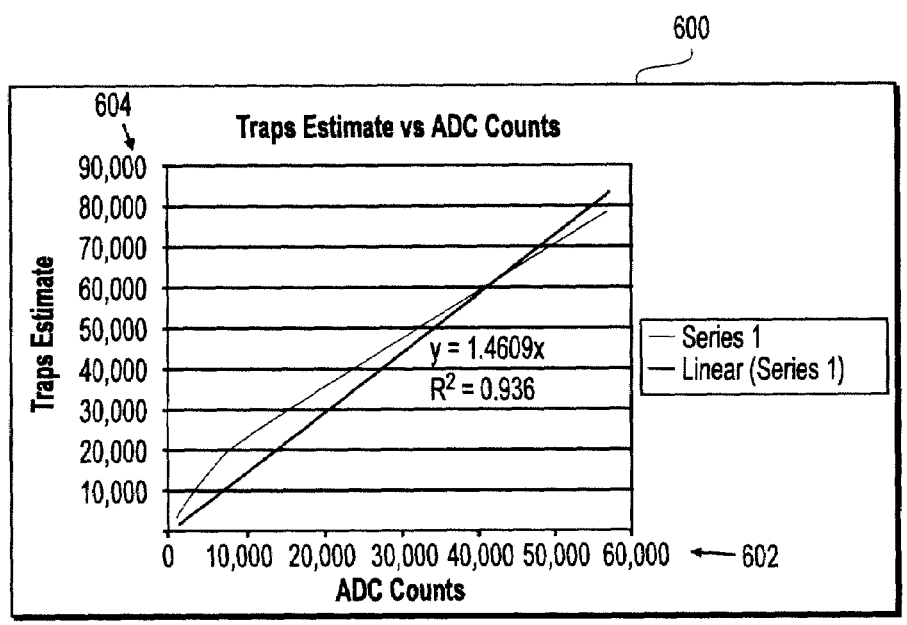
FIG. 6 is a graph illustrating an example of a model based on the electrical circuit of FIG. 4

FIG. 6 is a graph 600 illustrating an example of a model based on the electrical circuit of FIG. 4. The horizontal axis 602 may represent the detector dose rate, or counts in a single frame of projection data. The vertical axis 604 may represent the total number of traps estimated to be filled. FIG. 6 is an example of a data taken from 20 seconds x-ray on, and 60 seconds x-ray off. FIG. 6 groups all traps together, which is equivalent to using a single energy level. The horizontal axis may be thought of as a voltage V, and the vertical axis as charge Q. The slope of the plot may then equal C, using the relation Q=C×V. C may also be the capacitance of the trap capacitor.

Figure 7:
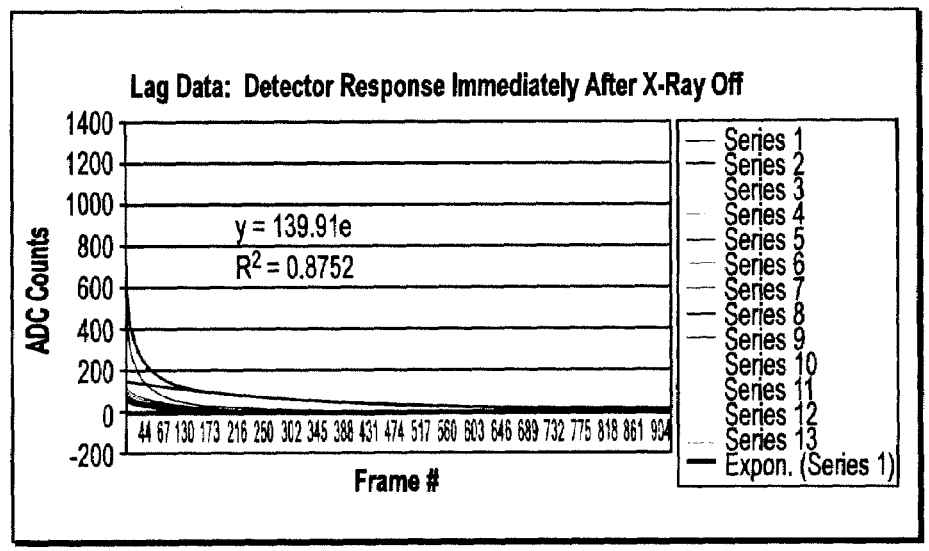
FIG. 7 is a graph illustrating an example of a lag data in accordance with one embodiment.
Figure 8A:
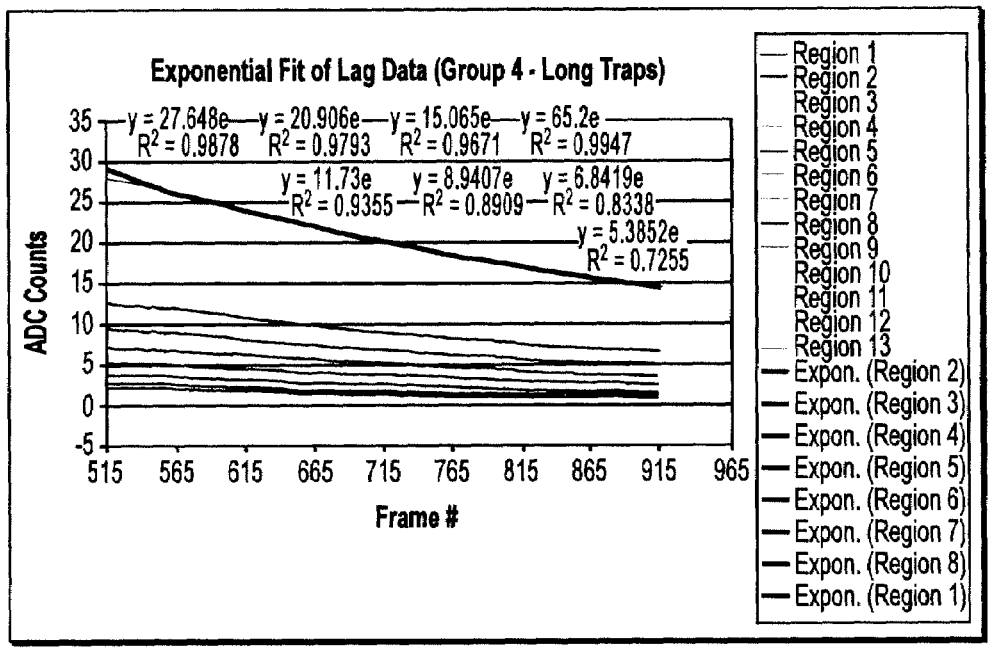
FIGS. 8A-8D are graphs illustrating examples of lag data broken into four groups.
Figure 8B:
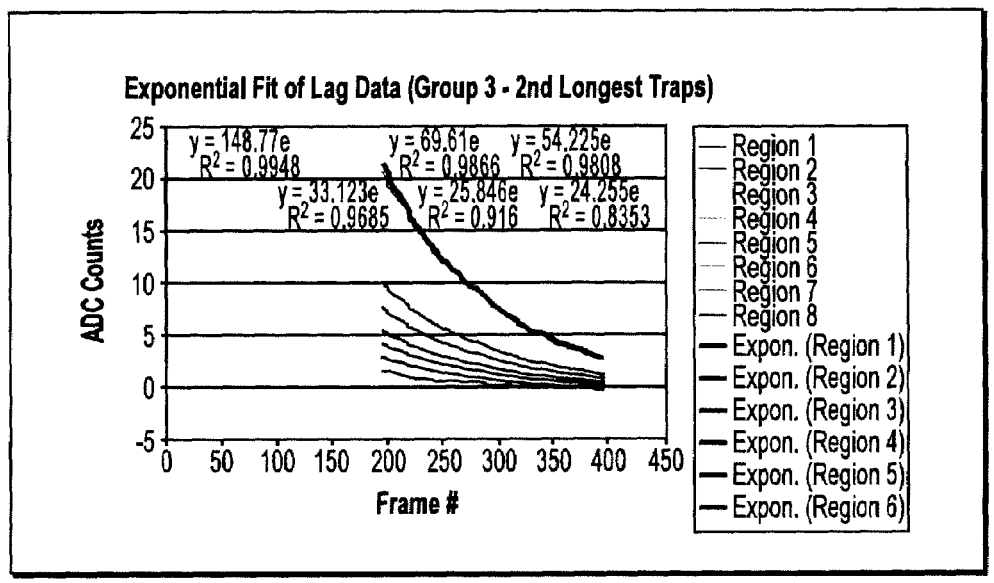
Figure 8C:
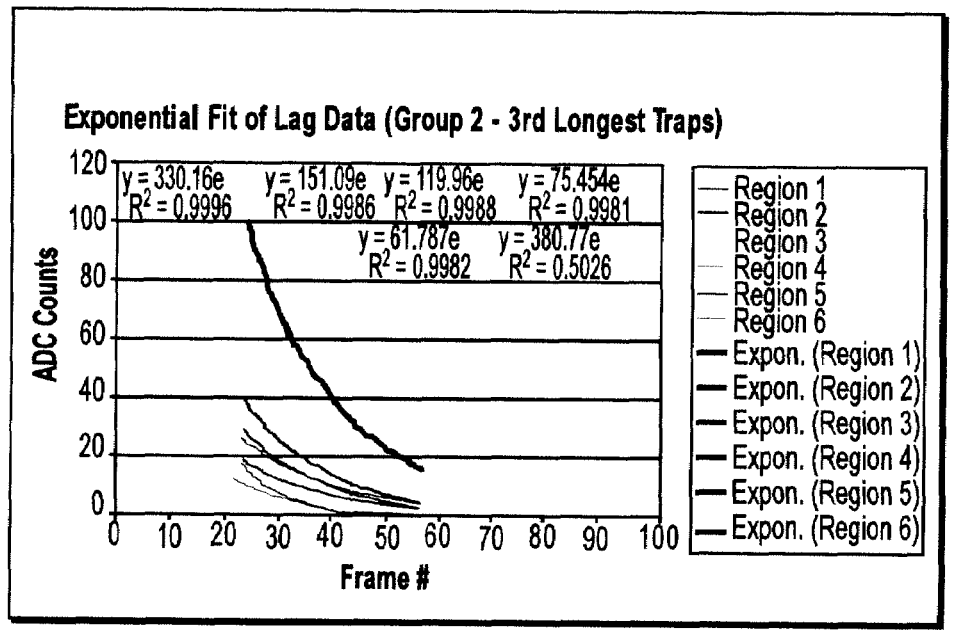
Figure 8D:
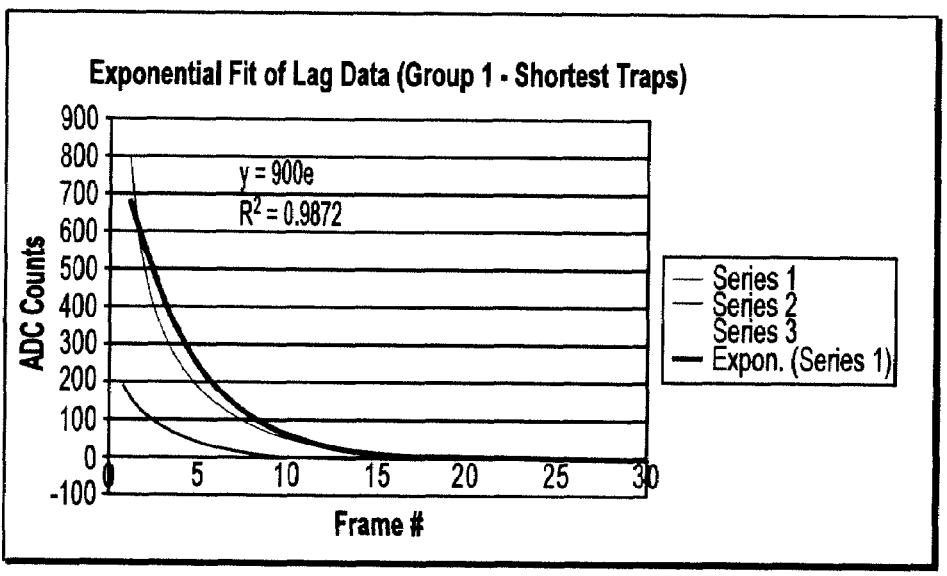

The number of traps filled in FIG. 6 was generated by fitting an exponential to the tail of the lag data in FIG. 7 and integrating from time T=0 to infinity. The time constant t=RC, can be found from the exponential, and then R can be found from t. In the case where four capacitors are used instead of one, the lag data is broken up and fit with exponentials in a recursive manner as described in FIGS. 8A-8D.

FIG. 7 is a graph illustrating an example of a lag data used to generate the model in FIG. 6. The lag data shown is from a 20 sec on, 60 sec off Picker phantom experiment. An exponential was fit to the highest dose rate region. The fit can be seen to be quite poor. The reason is that the signal is actually made up of multiple exponentials, not a single exponential.

FIGS. 8A-8D are graphs illustrating an example of fitting lag data to generate an empirical model. The lag data from FIG. 7 was broken up into four separate groups. The last group, which is the very end of the lag data, was fit with an exponential (and the fit was quite good). That exponential was then forecasted back to Frame 0, and it was subtracted out to create modified lag data. The tail of the modified lag data was then fit with another exponential, and the process repeated. Note, for a given plot, the exponential decay rates are almost equal for different dose rates.

From the exponential fits, two pieces of information are determined: (1) the RC time constant for a group, and (2) an estimate of the total number of traps at an energy level (as a function of dose) by extrapolating the exponential from 0 to ∞.

Figure 9A:
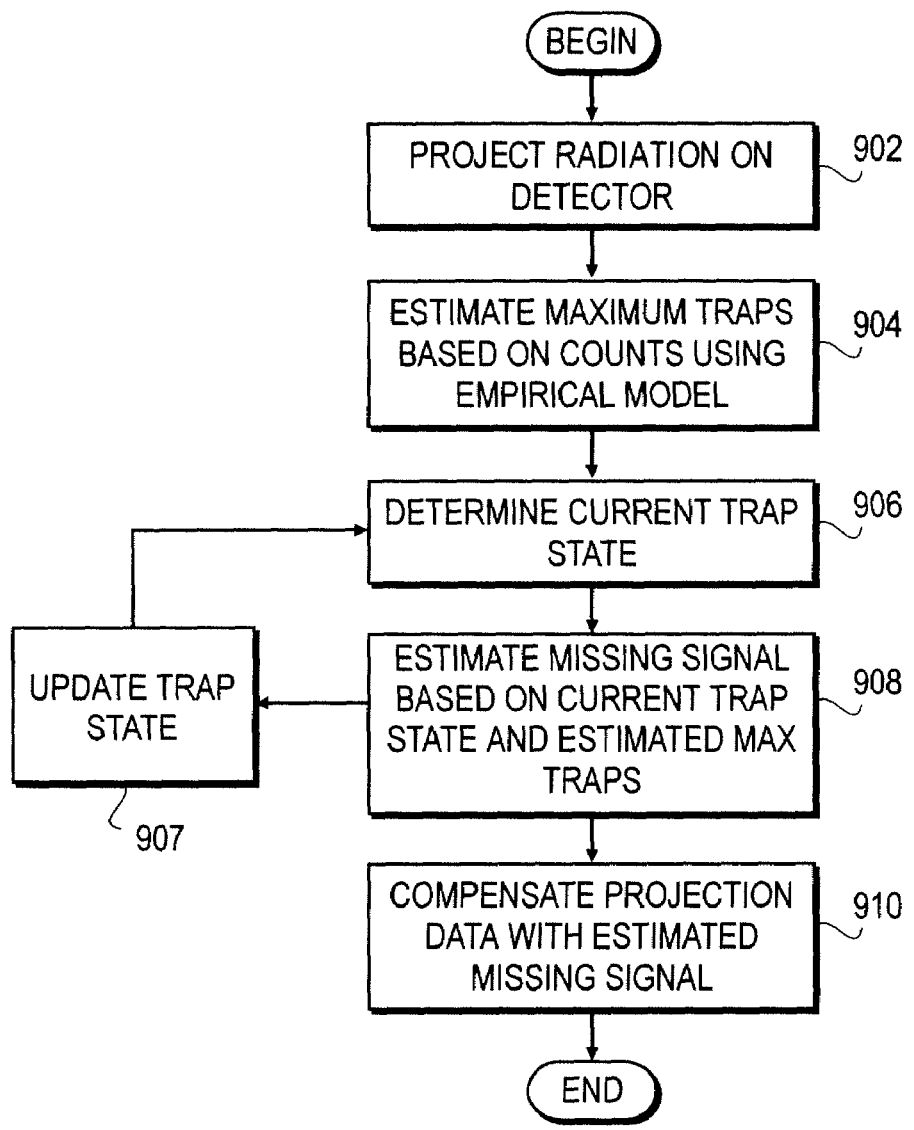
FIG. 9A is a flow diagram illustrating a method for correcting an output of a detector in accordance with one embodiment.

FIG. 9A is a flow diagram illustrating a method for correcting an output of a detector in accordance with one embodiment. At 902, a source of x-ray generates an x-ray beam onto a detector as previously described. Data is collected. At 904, a total number of traps to be filled by the detector is estimated based on the counts using the empirical model as previously described. At 906, a current state of the trap of the detector is determined. In particular, a currently present number of filled traps is determined. The state of the trap may be determined recursively from the historical usage of the detector. At 908, if the total number of traps to be filled is higher than the currently present number of filled traps, a missing signal is determined. The missing signal is estimated based on the total number of traps to be filled and on the currently present number of filled traps. At 907, the trap state is updated based on the information from 908 and fed back into 906. At 910, the collected data is compensated or modified by adding the missing signal to the collected data.

One example of correction may be calculated as follows. A few assumptions are made. First, the output capacitor is assumed to be 1F. (The actual value doesn't matter, it would just scale all the other numbers). Second, the current flowing into the output capacitor is assumed to be constant during the frame time, which means the voltage across the output capacitor is a ramp function. Thus, the voltage across any trap branch is a ramp function from 0 to Vm (the measured ADC value, interpreted as a voltage . . . i.e. 10,000 counts=10,000 Volts). In reality, this is almost true because the current flowing into the trap capacitors is very small.

Since the voltage across each trap branch (the R and C) is assumed to be a linear ramp, the charge that flows into the trap C can be calculated for a given frame time.

$$\Delta q_i = C(e^{-1/R_i C_i} - 1)(V_m R_i C_i + V_i(0)) + V_m$$

$V_i(0)$ is the initial charge on the trap C at the beginning of the frame. $V_i(0)$ is the state variable the takes into account the past history of each detector element. The subscript i indicates which trap circuit branch is being referenced.

In accordance with another embodiment, the following equation may be used to determine Delta $q_i$, for the ith trap capacitor for a given frame whose dose corresponds to an output voltage of Vm:

$$\text{Delta } qi = C(Vm - Vi(0))(1 - e(-1/RiCi))$$

It should be noted that all the measurements and corrections are done with reference to frame number, and not absolute time. All measurements and data were collected at 15 fps.

A different model of the readout electronics is assumed for simplicity. When no x-rays are hitting the panel, the output capacitor contains zero charge. When irradiated, the output capacitor charges linearly from 0 Volts to Vm Volts during the entire frame time.

Figure 9B:
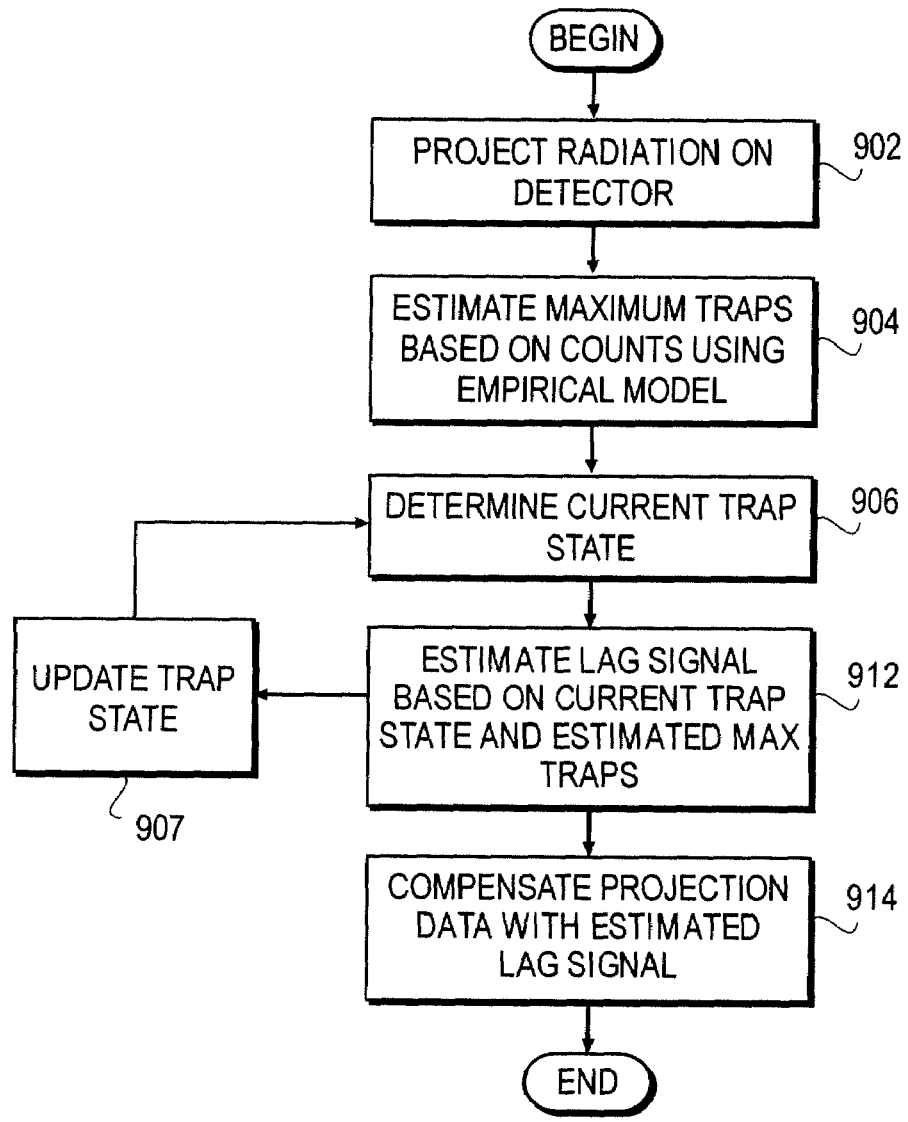
FIG. 9B is a flow diagram illustrating a method for correcting an output of a detector in accordance with another embodiment.

FIG. 9B is a flow diagram illustrating a method for correcting an output of a detector in accordance with another embodiment. At 902, a source of x-ray generates an x-ray beam onto a detector as previously described. Data is collected. At 904, a total number of traps to be filled by the detector is estimated based on the counts using the empirical model as previously described. At 906, a current state of the trap of the detector is determined. In particular, a currently present number of filled traps is determined. The state of the trap may be determined recursively from the historical usage of the detector. At 912, if the total number of traps to be filled is less than the currently present number of filled traps, a lag signal is determined. The lag signal is estimated based on the total number of traps to be filled and on the currently present number of filled traps. At 907, the trap state is updated based on the information from 912 and fed back into 906. At 914, the collected data is compensated or modified by subtracting lag signal from the collected data.

Figure 10:
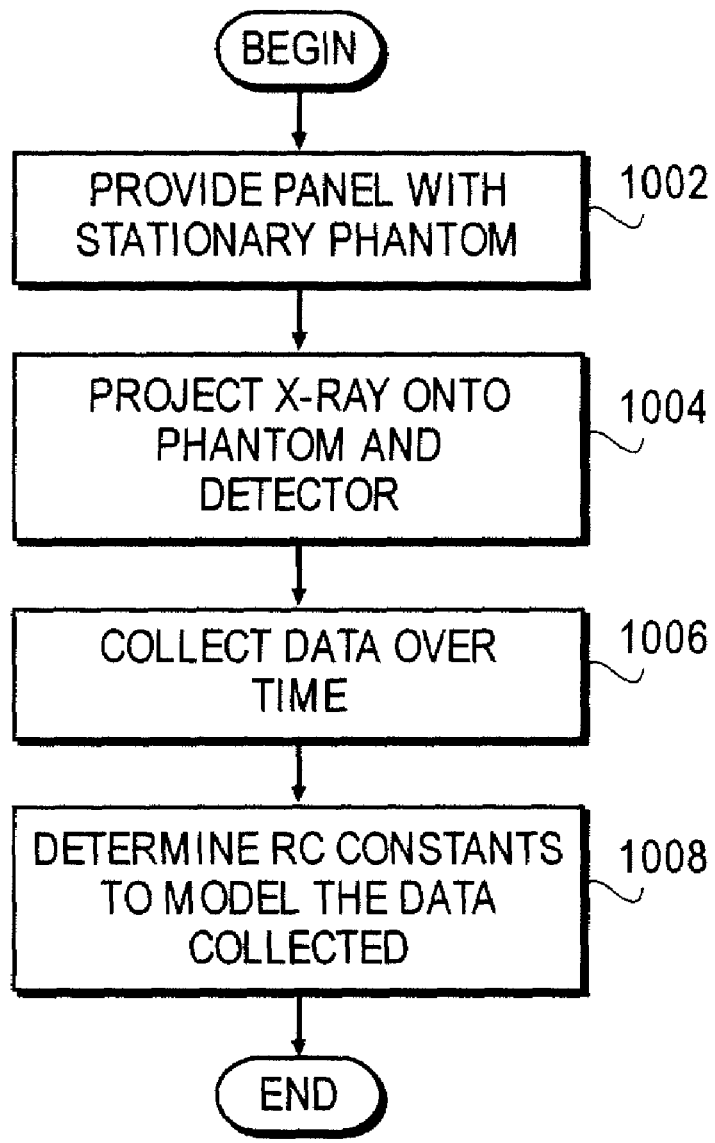
FIG. 10 is a flow diagram illustrating a method for determining an empirical model of a detector of an imaging system in accordance with one embodiment.

FIG. 10 is a flow diagram illustrating a method for determining an empirical model of a detector of an imaging system in accordance with one embodiment. A stationary object or phantom is provided at 1002. Radiation is projected onto the object adjacent to a detector at 1004. Projection data may be collected over time at 1006. The RCs constants in the multi-exponential signals may then be estimated at 1008.

In accordance with another embodiment, an optimization routine (or other algorithm) may be used to find the best set of parameters that minimize gain change and lag signal for a specific test dataset. The assumption of a multi-exponential process is generalized to some other function which may better describe the gain change and lag effects seen in the detector. This model may be non-physical. Once the parameters are known, the true photo-diode current can be estimated and corrections applied to the projected data.

In accordance with another embodiment, the parameter values (RC) may be based on whether the traps are filling or emptying (i.e. x-rays are turned on or off). The trap filling and emptying may be modeled using separate impulse response functions. For example, the circuit of FIG. 4 for a given set of RC) can be represented as an impulse response function.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
estimating a total number of traps to be filled in a detector of an imaging system based on a measured signal sensed by the detector using an empirical model; and
adjusting the measured signal based on the estimated total number of traps and a current trap state of the detector,
wherein the empirical model is determined by:
providing an object adjacent to the detector of the imaging system;
projecting radiation onto the object and the detector;
collecting data from the detector over a period of time; and
estimating one or more constant parameters associated with the detector based on the collected data, the one or more constant parameters further comprising: one or more resistance value, one or more capacitance value from an RC network, the one or more resistance value representing a trap filling or trap emptying, the one or more capacitance value representing a maximum number of traps at an energy level of the radiation.

2. The method of claim 1, further comprising:
determining a current trap state of the detector.

3. The method of claim 2, further comprising:
determining a current number of filled traps present in the detector.

4. The method of claim 3, further comprising:
adding an estimated missing signal to the measured signal when the current number of filled traps present in the detector is less than the estimated total number of traps to be filled by the detector.

5. The method of claim 3, further comprising:
subtracting an estimated lag signal to the measured signal when the current number of filled traps present in the detector is greater than the estimated total number of traps to be filled by the detector.

6. The method of claim 1, wherein the RC network includes a plurality of RC branches, each RC branch representing an energy level of the radiation.

7. The method of claim 1, wherein adjusting further comprises:
determining a compensation signal based on the total number of traps and the current trap state of the detector; and
compensating the measured signal with the compensation signal.

8. The method of claim 1, wherein the measured signal includes a measured signal of an image frame of the imaging system, the imaging system having a source of radiation, and the detector for sensing radiation from the source and generating data representative of the radiation.

9. A program storage device readable by a machine, tangibly embodying a program of instructions executable by the machine to perform a method for compensating a measured signal of an imaging system, the method including:
estimating a total number of traps to be filled in a detector of the imaging system based on the measured signal sensed by the detector using an empirical model; and
adjusting the measured signal based on the estimated total number of traps and a current trap state of the detector,
wherein the empirical model is determined by:
providing an object adjacent to the detector of the imaging system;
projecting radiation onto the object and the detector;
collecting data from the detector over a period of time; and
estimating one or more constant parameters associated the detector based on the collected data, the one or more constant parameters further comprising: one or more resistance value, one or more capacitance value from an RC network, the one or more resistance value representing a trap filling or trap emptying, the one or more capacitance value representing a maximum number of traps at an energy level of the radiation.

10. The method of claim 9, further comprising:
determining a current trap state of the detector.

11. The method of claim 10, further comprising:
determining a current number of traps present in the detector.

12. The method of claim 11, further comprising:
adding an estimated missing signal to the measured signal when the current number of filled traps present in the detector is less than the estimated total number of traps to be filled by the detector.

13. The method of claim 11, further comprising:
subtracting an estimated lag signal to the measured signal when the current number of filled traps present in the detector is greater than the estimated total number of traps to be filled by the detector.

14. The method of claim 9, wherein the RC network includes a plurality of RC branches, each RC branch representing an energy level of the radiation.

15. The method of claim 9, wherein adjusting further comprises:
determining a compensation signal based on the total number of traps and the current trap state of the detector; and
compensating the measured signal with the compensation signal.

16. The method of claim 9, wherein the measured signal includes a measured signal of an image frame of the imaging system, the imaging system having a source of radiation, and the detector for sensing radiation from the source and generating data representative of the radiation.

17. An imaging system
a source of radiation;
a detector for sensing radiation from the source and generating data representative of the radiation; and
a processor coupled to the detector and configured to modify the data based on an estimated total number of traps and a current trap state of the detector,
wherein the processor is configured to estimate a total number of traps to be filled by the detector based on a measured signal sensed by the detector using an empirical model,
wherein the empirical model is determined by:
providing an object adjacent to the detector of the imaging system;
projecting radiation onto the object and the detector;
collecting data from the detector over a period of time; and
estimating one or more constant parameters associated the detector based on the collected data, the one or more constant parameters further comprising: one or more resistance value, one or more capacitance value from an RC network, the one or more resistance value re representing a trap filling or trap emptying, the one or more capacitance value representing a maximum number of traps at an energy level of the radiation.

18. The imaging system of claim 17, wherein the source of radiation include an x-ray source emitting an x-ray beam.

19. The imaging system of claim 18, wherein the detector further comprises at least one solid state x-ray detector.

20. The imaging system of claim 19, wherein the detector further comprises a thin-film transistor (TFT), a capacitor, a photodiode, or a photoconductor.

21. The imaging system of claim 17, wherein the processor is configured to adjust the measured signal based on the estimated total number of traps and the current trap state of the detector.

22. The imaging system of claim 21, wherein the processor is configured to add an estimated missing signal to the measured signal when the current number of filled traps present in the detector is less than the estimated total number of traps to be filled by the detector.

23. The imaging system of claim 21, wherein the processor is configured to subtract an estimated lag signal to the measured signal when the current number of filled traps present in the detector is greater than the estimated total number of traps to be filled by the detector.

* * * * *